United States Patent [19]

Wang et al.

[11] Patent Number: 6,083,298

[45] Date of Patent: Jul. 4, 2000

[54] PROCESS FOR FABRICATING A SORBENT-BASED GAS STORAGE AND DISPENSING SYSTEM, UTILIZING SORBENT MATERIAL PRETREATMENT

[75] Inventors: Luping Wang, Brookfield; James V. McManus, Danbury, both of Conn.

[73] Assignee: Advanced Technology Materials, Inc., Danbury, Conn.

[21] Appl. No.: 09/143,809

[22] Filed: Aug. 31, 1998

Related U.S. Application Data

[63] Continuation-in-part of application No. 08/809,019, filed as application No. PCT/US95/13040, Mar. 27, 1998, Pat. No. 5,935,305, and a continuation-in-part of application No. 08/322,224, Oct. 13, 1994, Pat. No. 5,518,528.

[51] Int. Cl.[7] .................................................. B01D 53/04
[52] U.S. Cl. .................................. 95/99; 95/97; 95/102; 95/104; 95/106; 95/117; 95/139; 95/140
[58] Field of Search .................................. 95/95, 96, 103, 95/106, 114, 115, 127, 131–133, 148, 902, 97, 99, 101, 102, 104, 117, 121, 123, 126, 138, 139, 140, 143; 96/108, 121, 122, 126–128, 130–132, 143, 146, 147; 206/0.7

[56] References Cited

U.S. PATENT DOCUMENTS

| | | | |
|---|---|---|---|
| 240,423 | 4/1881 | James | 206/0.7 X |
| 1,608,155 | 11/1926 | Barnebey | 206/0.7 X |
| 1,714,245 | 5/1929 | Schaefer | 96/146 X |
| 2,356,334 | 8/1944 | Maude et al. | 206/0.7 X |
| 2,450,289 | 9/1948 | Marek | 96/146 X |
| 2,663,626 | 12/1953 | Spangler | 206/0.7 X |
| 2,987,139 | 6/1961 | Bush | 95/133 |
| 2,997,371 | 8/1961 | Wadsworth et al. | 95/131 X |
| 3,006,153 | 10/1961 | Cook | 206/0.7 X |
| 3,037,338 | 6/1962 | Thomas | 95/104 |
| 3,080,307 | 3/1963 | Rinals | 96/127 X |
| 3,093,564 | 6/1963 | Weisman et al. | 96/127 X |
| 3,116,132 | 12/1963 | Haller et al. | 95/132 |
| 3,144,200 | 8/1964 | Taylor et al. | 96/108 X |
| 3,176,444 | 4/1965 | Kiyonaga | 95/97 X |

(List continued on next page.)

FOREIGN PATENT DOCUMENTS

| | | | |
|---|---|---|---|
| 1095796 | 12/1960 | Germany | 95/133 |
| 2264512 | 1/1974 | Germany | 95/133 |
| 3139-781 | 4/1983 | Germany | 96/122 |
| 52-72373 | 6/1977 | Japan | 96/130 |
| 61-133116 | 6/1986 | Japan | 96/126 |
| 63-88017 | 4/1988 | Japan | 96/121 |
| 3-127606 | 5/1991 | Japan | 96/108 |
| 1181692A | 9/1985 | U.S.S.R. | 95/133 |
| 1544475A1 | 2/1990 | U.S.S.R. | 95/131 |
| 1583151A1 | 8/1990 | U.S.S.R. | 95/133 |

OTHER PUBLICATIONS

McManus, J.V. et al., "A Zeolite–Based Atmospheric Pressure Hydride Gas Source for Ion Implantation", paper presented a t the X International Conference on Ion Implanatation Technology, Catania, Italy, Jun. 13–17, 1994.

Supelco–Tech Service, New Generation of Ambersorb, Nov. 2, 1995, pp. 3–12.

Supelco–Tech Service,, "Ambersorb Carbonaceous Adsorbents Vapor Phase Adsorption Test Procedures" Rohm and Haas Company, 1990, pp. 13–16.

"Beaded Carbon UPS Solvent Recovery", *Chemical Engineering*, vol. 84, No. 18, pp. 39–40, Aug. 29, 1977.

*Primary Examiner*—Robert H. Spitzer
*Attorney, Agent, or Firm*—Steven J. Hultquist; Oliver A.M. Zitzmann

[57] ABSTRACT

A process for fabricating a gas storage and dispensing system including a dispenser container for holding a physical sorbent material having sorptive affinity for (i) a sorbable dispensing gas to be held in and subsequently selectively discharged from the dispenser container, and (ii) extraneous sorbables, in which the physical sorbent material, having extraneous sorbables sorbed thereon, is treated to desorb from the sorbent material at least part of the extraneous sorbables, prior to loading the sorbent material into a gas storage and dispensing container.

51 Claims, 3 Drawing Sheets

U.S. PATENT DOCUMENTS

| | | | |
|---|---|---|---|
| 3,264,803 | 8/1966 | Read | 96/146 X |
| 3,287,432 | 11/1966 | Sensel | 95/95 |
| 3,415,069 | 12/1968 | Hauser | 96/126 X |
| 3,469,375 | 9/1969 | Barrington et al. | 96/146 X |
| 3,675,392 | 7/1972 | Reighter | 95/96 |
| 3,713,273 | 1/1973 | Coffee | 96/128 X |
| 3,719,026 | 3/1973 | Sand | 95/106 |
| 3,788,036 | 1/1974 | Lee et al. | 96/130 X |
| 4,023,701 | 5/1977 | Dockery | 206/0.7 X |
| 4,099,936 | 7/1978 | Tarancon | 95/127 |
| 4,158,639 | 6/1979 | Berty | 95/127 X |
| 4,168,149 | 9/1979 | Armond et al. | 95/96 X |
| 4,263,018 | 4/1981 | McCombs et al. | 96/130 X |
| 4,343,770 | 8/1982 | Simons | 206/0.7 X |
| 4,414,005 | 11/1983 | DeBievre et al. | 95/127 |
| 4,477,265 | 10/1984 | Kumar et al. | 95/96 X |
| 4,552,571 | 11/1985 | Dechene | 95/96 X |
| 4,578,256 | 3/1986 | Nishino et al. | 95/133 X |
| 4,673,415 | 6/1987 | Stanford | 95/96 X |
| 4,723,967 | 2/1988 | Tom | 96/108 X |
| 4,738,693 | 4/1988 | Tom | 96/108 X |
| 4,738,694 | 4/1988 | Godino et al. | 96/126 X |
| 4,744,221 | 5/1988 | Knollmueller | 62/48 |
| 4,749,384 | 6/1988 | Nowobilski | 96/108 X |
| 4,761,395 | 8/1988 | Tom et al. | 502/401 |
| 4,869,733 | 9/1989 | Stanford | 95/96 X |
| 4,881,958 | 11/1989 | Eckardt et al. | 96/127 |
| 5,051,117 | 9/1991 | Prigge et al. | 95/95 |
| 5,089,244 | 2/1992 | Parent et al. | 95/133 X |
| 5,094,830 | 3/1992 | Tom et al. | 95/121 X |
| 5,114,440 | 5/1992 | Reiss | 95/96 |
| 5,133,787 | 7/1992 | Diot et al. | 96/121 |
| 5,151,395 | 9/1992 | Tom | 502/67 |
| 5,202,096 | 4/1993 | Jain | 96/126 X |
| 5,224,350 | 7/1993 | Mehra | 95/96 X |
| 5,238,469 | 8/1993 | Briesacher et al. | 96/126 X |
| 5,385,689 | 1/1995 | Tom et al. | 252/194 |
| 5,409,526 | 4/1995 | Zheng et al. | 96/132 |
| 5,417,742 | 5/1995 | Tamhankar et al. | 95/96 |
| 5,518,528 | 5/1996 | Tom et al. | 95/103 |
| 5,676,735 | 10/1997 | McManus | 95/106 X |
| 5,704,965 | 1/1998 | Tom et al. | 96/143 X |
| 5,704,967 | 1/1998 | Tom et al. | 96/143 |
| 5,707,424 | 1/1998 | Tom et al. | 96/143 X |
| 5,837,027 | 11/1998 | Olander et al. | 95/104 X |
| 5,935,305 | 8/1999 | Tom et al. | 96/143 |

United States Patent 6,083,298

PROCESS FOR FABRICATING A SORBENT-BASED GAS STORAGE AND DISPENSING SYSTEM, UTILIZING SORBENT MATERIAL PRETREATMENT

CROSS-REFERENCE TO RELATED APPLICATIONS

This is a continuation-in-part of U.S. patent application Ser. No. 08/809,019 filed Mar. 27, 1998 in the names of Glenn M. Tom and James V. McManus for "STORAGE AND DELIVERY SYSTEM FOR GASEOUS COMPOUNDS," which issued as U.S. Pat. No. 5,935,305, which is a 35 USC §371 application of International Patent Application No. PCT/US95/13040 filed on Oct. 13, 1995 and claiming the priority of U.S. patent application Ser. No. 08/322,224 filed Oct. 13, 1994, now issued as U.S. Pat. No. 5,518,528 as a continuation-in-part thereof.

BACKGROUND OF THE INVENTION

1. Field of the Invention

This invention relates generally to the fabrication of storage and dispensing systems for the selective dispensing of fluids from a vessel or storage container in which the fluid component(s) are held in sorptive relationship to a solid sorbent medium, and are desorptively released from the sorbent medium in the dispensing operation.

2. Description of the Related Art

In a wide variety of industrial processes and applications, there is a need for a reliable source of process fluid(s).

Such process and application areas include semiconductor manufacturing, ion implantation, manufacture of flat panel displays, medical intervention and therapy, water treatment, emergency breathing equipment, welding operations, space-based delivery of liquids and gases, etc.

U.S. Pat. No. 5,518,528 issued May 21, 1996 in the names of Glenn M. Tom and James V. McManus, describes a gas storage and dispensing system, for the storage and dispensing of gases. The gas storage and dispensing system of the Tom et al. patent comprises an adsorption-desorption apparatus, for storage and dispensing of gases, e.g., hydride gases, halide gases, organometallic Group V compounds, etc., including: a storage and dispensing vessel constructed and arranged for holding a solid-phase physical sorbent medium, and for selectively flowing gas into and out of said vessel; a solid-phase physical sorbent medium disposed in said storage and dispensing vessel at an interior gas pressure; a sorbate gas physically adsorbed on the solid-phase physical sorbent medium; and a dispensing assembly coupled in gas flow communication with the storage and dispensing vessel, for selectively discharging gas from the vessel with desorption of the gas from the sorbent medium in the vessel.

The desorption may be effected by thermally desorbing the gas to be dispensed, or by providing a pressure differential between the vessel interior volume and an exterior dispensing locus, e.g., by imposition of a vacuum on the storage and dispensing vessel or by pumping the gas to the desired site of use of the dispensed gas. As a result of such dispensing modes, the gas pressure in the storage and dispensing vessel may be at atmospheric or below atmospheric pressure levels.

The storage and dispensing vessel of the Tom et al. patent thus embodies a substantial advance in the art, relative to the prior art use of high pressure gas cylinders. Conventional high pressure gas cylinders are susceptible to leakage from damaged or malfunctioning regulator assemblies, as well as to rupture if internal decomposition of the gas leads to rapid increasing interior gas pressure in the cylinder and the risk of cylinder rupture or other unwanted bulk release of gas from the cylinder.

The gas storage and dispensing vessel of the Tom et al. patent reduces the pressure of stored sorbate gases by reversibly adsorbing them onto a carrier sorbent medium, e.g., a zeolite or activated carbon material.

In use of the gas storage and dispensing system of the above-described Tom et al. patent, it is desirable to dispense storage gas at a high level of purity in a number of end use applications, such as for example in the manufacture of microelectronic device structures.

In many instances, this desired high purity characteristic of the gas storage and dispensing system is compromised by the residual or "native" contaminants sorptively retained on the sorbent material. This is attributable to the sorptive character of such materials, and is characteristic of all commercially available sorbent materials to some degree, with the extent or concentration of such extraneous sorbable species varying depending on the specific sorbent composition, its manufacturing process, and its history of storage, transport and environmental exposure.

Thus, for example, a sorbent material which is manufactured with high degree of purity may nonetheless in subsequent storage be exposed to atmospheric moisture and ambient gases, or to gas species in the containers in which such sorbent materials are originally furnished from the manufacturer, which sorb on and contaminate the sorbent material.

Under such circumstances, when the sorbent material containing extraneous sorbable species is loaded in the gas storage and dispensing vessel, and the dispensing gas (i.e., the gas to be stored and thereafter selectively dispensed from the vessel) is introduced to the sorbent for take-up and loading thereon, the sorptive capacity of the sorbent material may be adversely affected by the presence of the extraneous sorbables. Additionally, such extraneous sorbables then can desorb during the subsequent dispensing operation, with the result that the dispensed gas is of reduced purity due to the extraneous sorbables therein.

For example, when an activated carbon sorbent material is employed in the gas storage and dispensing vessel and the vessel holding the sorbent is loaded with a hydride gas such as arsine (e.g., for subsequent dispensing in ion implantation operations to produce arsenic-doped semiconductor substrates), the dispensed arsine gas may contain relatively high carbon monoxide and carbon dioxide impurity levels deriving from the originally provided activated carbon sorbent—carbon monoxide levels which are as high as 20–50 parts per million by volume (ppmv) or higher, and corresponding carbon dioxide levels which may exceed 100 ppmv.

It would therefore be a significant advance in the art of such gas storage and dispensing systems to provide a system which overcomes such extraneous sorbables impurity problem, and enables the on-demand dispensing of high-impurity gas.

It therefore is an object of the invention to provide a gas storage and dispensing system of the general type disclosed in Tom et al. U.S. Pat. No. 5,518,528 which obviates such extraneous sorbables problem and enables selective dispensing of high purity gas.

Other objects and advantages of the invention will be more fully apparent from the ensuing disclosure and appended claims.

SUMMARY OF THE INVENTION

The present invention generally relates to a process for fabricating a gas storage and dispensing system including a dispenser container for holding a physical sorbent material having sorptive affinity for (i) a sorbable dispensing gas to be held in and subsequently selectively discharged from the dispenser container, and (ii) extraneous sorbables.

In one aspect, the process of the invention comprises:

treating the physical sorbent material, having extraneous sorbables sorbed thereon, to desorb from the sorbent material at least part of the extraneous sorbables;

loading the physical sorbent material in the container;

introducing the sorbable dispensing gas into the dispensing container holding the physical sorbent material for physical sorption of the dispensing gas on the physical sorbent material; and sealing the dispenser container holding the dispenser gas on the physical sorbent material so that the dispenser container thereafter contains the dispensing gas in a form available for selective dispensing by desorption of the dispensing gas from the physical sorbent material and discharging of the dispensing gas from the container.

In such process, the step of treating the physical sorbent material to desorb from the sorbent material at least part of said extraneous sorbables, advantageously comprises at least one of the steps of:

(a) heating the physical sorbent material to thermally desorb extraneous sorbables therefrom;

(b) flowing a non-sorbable gas in contact with the physical sorbent material to desorb the extraneous sorbables from the physical sorbent material into the flowing non-sorbable gas; and (c) applying vacuum conditions to the physical sorbent material to vacuum desorb the extraneous sorbables from the physical sorbent material.

In another aspect of the invention, the step of treating the physical sorbent material to desorb from the sorbent material at least part of said extraneous sorbables, may comprise at least two of the foregoing steps (a)–(c).

Such steps may be carried out in any useful combination or permutation, as necessary or desirable in the given end use application of the process to the fabrication of a specific gas storage and dispensing container.

In a preferred aspect, the process of the invention is carried out such that for a time beginning with the step of (1) treating the physical sorbent material to desorb at least part of the extraneous sorbables from the sorbent material, and ending with the completion of the step of (2) sealing the dispenser container so that it thereafter contains the dispensing gas in a form available for selective dispensing, the physical sorbent material is isolated from contact with atmospheric gases, most preferably being isolated from contact with oxygen and water vapor.

In another aspect of the invention, when an activated carbon material is used as the sorbent material, it generally is desirable to carry out the treatment of the physical sorbent material to remove extraneous sorbables therefrom by step (s) including heating of the sorbent to a temperature exceeding 650° C., preferably with isolation of the sorbent material from contact with oxygen and water vapor during and subsequent to such treatment, until the dispenser container is sealed so that it thereafter contains the dispensing gas in a form available for selective dispensing.

In the broad practice of the invention, the treatment of the physical sorbent material to desorb from the sorbent material at least part of said extraneous sorbables, may be carried out before and/or after the physical sorbent material is loaded into the container, as comprising for example a pre-loading step of heating the physical sorbent material in a flowing gas stream of inert gas, and a post-loading step of heating the physical sorbent material in the container under vacuum conditions.

The physical sorbent material used in process to fabricate the gas storage and dispensing system may be of any suitable type, as for example alumina, silica, crystalline aluminosilicates, macroreticulate polymers, kieselguhr, carbon, etc. Bead activated carbon sorbent materials are particularly preferred in the broad practice of the invention.

The extraneous sorbables may be of widely varying type, depending on the specific physical sorbent material employed, and its history of manufacture, storage and environmental exposure. Some illustrative gas species which are undesirable sorbate components on the sorbent material include, but are not limited to, water vapor, oxygen, hydrogen, carbon oxides, nitrogen, hydrocarbons, halogens, and combinations thereof, as well as compositions containing one or more of the foregoing species.

In the case of the preferred carbon sorbent materials, the extraneous sorbables of typical concern include carbon oxides, e.g., carbon monoxide and carbon dioxide.

In a preferred aspect, wherein carbon is the sorbent material, e.g., in a bead activated carbon form, and wherein carbon monoxide and carbon dioxide are the extraneous sorbables of concern, the process of the invention may be carried out to yield a carbon monoxide level of less than 20 parts per million volume (ppmv) in arsine, more preferably less than 10 ppmv, and even more preferably less than 5 ppmv, when the physical sorbent material is loaded with arsine gas at a loading of 50% weight based on the weight of the physical sorbent material, a pressure of 700 Torr and a temperature of 22° C., and/or to yield a carbon dioxide level of less than 50 parts per million volume (ppmv) in arsine, more preferably less than 20 ppmv, and even more preferably less than 10 ppmv when the physical sorbent material is loaded with arsine gas at a loading of 50% weight based on the weight of the physical sorbent material, a pressure of 700 Torr and a temperature of 22° C.

In another preferred aspect, the process of the invention is carried out in which the step of treating the physical sorbent material, having extraneous sorbables sorbed thereon, to desorb from the sorbent material at least part of the extraneous sorbables, comprises heating the physical sorbent material before loading the physical sorbent material in the container to a temperature in the range of from about 300 to about 800° C. for sufficient time to effect desorption of the extraneous sorbables therefrom.

During such heating, an inert gas, e.g., helium, may be flowed in contact with the physical sorbent material, and after being loaded in the container, the sorbent material may be further treated by steps such as further heating the physical sorbent material, and/or applying vacuum to the physical sorbent material.

The sorbable dispensing gas introduced to the treated physical sorbent material in the gas storage and dispensing container may be of any suitable type, for which the treated adsorbent has a suitable sorptive affinity, such as for example silane, diborane, arsine, phosphine, chlorine, $BCl_3$, $BF_3$, $B_2D_6$, tungsten hexafluoride, $(CH_3)_3Sb$, hydrogen fluoride, hydrogen chloride, $GeF_4$, $SiF_4$, deuterated hydrides, hydrogen iodide, hydrogen bromide, germane, ammonia, stibine, hydrogen sulfide, hydrogen selenide, hydrogen telluride, $NF_3$, or compatible mixtures of one or more of the foregoing gas species.

In one specific embodiment, the present invention relates to a process for fabricating a gas storage and dispensing system including a dispenser container for holding a bead activated carbon physical sorbent material having sorptive affinity for (i) a sorbable dispensing gas to be held in and subsequently selectively discharged from the dispenser container, and (ii) extraneous sorbables, such process comprising:

treating the physical sorbent material, having extraneous sorbables sorbed thereon, to desorb from the sorbent material at least part of the extraneous sorbables, comprising heating the physical sorbent material to a temperature in a first range of from about 300° C. to about 800° C. and maintaining the temperature in the first range for a period of from about 1 to 15 hours, and during such heating flowing an inert gas in contact with the physical sorbent material;

loading the physical sorbent material in the container;

heating the physical sorbent material in the container to a temperature in a second range of from about 100° C. to about 250° C. and maintaining the temperature in the second range for a period of from about 1 to 10 hours, and during the heating applying vacuum to the physical sorbent material in the container;

cooling the physical sorbent material to a temperature below the second temperature range;

introducing the sorbable dispensing gas into the dispensing container holding the physical sorbent material for physical sorption of the dispensing gas on the physical sorbent material; and sealing the dispenser container holding the dispenser gas on the physical sorbent material so that the dispenser container thereafter contains the dispensing gas in a form available for selective dispensing by desorption of the dispensing gas from the physical sorbent material and discharging of the dispensing gas from the container.

In such embodiment, the process may be conducted to yield a carbon monoxide level of less than 1 part per million volume (ppmv) in arsine, and a carbon dioxide level of less than 1 part per million volume (ppmv) in arsine, when the treated physical sorbent material is loaded with arsine gas at a loading of 50% weight based on the weight of the physical sorbent material, a pressure of 700 Torr and a temperature of 22° C.

Other aspects, features and embodiments of the present invention will be more fully apparent from the ensuing disclosure and appended claims.

DETAILED DESCRIPTION OF THE INVENTION, AND PREFERRED EMBODIMENTS THEREOF

The disclosures of the following United States Patents and United States Patent Applications are hereby incorporated herein by reference in their entireties:

U.S. Pat. No. 5,518,528 issued May 21, 1996 in the names of Glenn M. Tom, et al.; U.S. Pat. No. 5,704,967 issued Jan. 6, 1998 in the names of Glenn M. Tom, et al.; U.S. Pat. No. 5,704,965 issued Jan. 6, 1998 in the names of Glenn M. Tom, et al.; U.S. Pat. No. 5,707,424 issued Jan. 13, 1998 to Glenn M. Tom, et al.; U.S. Pat. No. 5,676,735 issued Oct. 14, 1997 to James V. McManus; U.S. patent application Ser. No. 08/859,172 filed May 20, 1997 in the name of Glenn M. Tom, now issued as U.S. No. 5,761,910; and U.S. patent application Ser. No. 08/809,019 filed Apr. 11, 1997 in the names of Glenn M. Tom, et al. now issued as U.S. Pat. No. 5,935,305.

The present invention is based on the discovery that sorbent materials containing extraneous sorbables which contaminate the desorbate gas and cause diminution in product gas purity, may be processed as part of the fabrication of a gas storage and dispensing assembly of the type described in the aforementioned Tom et al. U.S. Pat. No. 5,518,528, to efficiently remove such extraneous sorbables and provide for high purity dispensing operations from the gas storage and dispensing vessel in subsequent use of the gas storage and dispensing system.

The extraneous sorbables may be of widely varying type, e.g., including sorbable components which are present on the sorbent material at the time of manufacturing the gas storage and dispensing system which is to utilize such sorbent. The extraneous sorbables may be atmospheric gases, such as air, oxygen, nitrogen, water vapor, hydrogen, carbon oxides such as carbon monoxide and carbon dioxide, nitrogen oxides such as $N_xO_y$, as well as hydrocarbons, halogens, and ambient environment species which may contact and become sorbed on the physical sorbent material.

In the process of the present invention, the physical sorbent material is treated to desorb the extraneous sorbables, so that the sorptive sites on the sorbent material are more fully available to the gas to be stored on the sorbent and subsequently dispensed from the storage and dispensing vessel holding the sorbent.

The treatment of the physical sorbent material for removing the extraneous sorbables may include any suitable combination of desorption techniques, including for example (i) heating the sorbent material to effect thermal desorption of the extraneous sorbables, (ii) flowing a non-sorbable gas such as an inert gas or other gas component or species to which the sorbent material has essentially zero sorptive affinity, in contact with the physical sorbent material to effect desorption by concentration differential, (iii) application of vacuum to the physical sorbent material to effect vacuum desorption, or combinations of such desorption steps.

It is typically preferred to utilize more than one of such steps, in order to ensure high levels of removal of the extraneous sorbables from the sorbent material. For example, heating may be carried concurrently with flowing of a stream of non-sorbable gas in contact with the physical sorbent.

As another alternative, vacuum conditions may be applied to the physical sorbent medium, during heating thereof.

Further, the desorption of extraneous sorbables from the sorbent material may be carried out before and/or after the sorbent material has been loaded in the storage and dispensing vessel, during fabrication of the gas storage and dispensing system.

For example, it may be desirable in some instances to heat the physical sorbent material to effect thermal desorption, concurrently with flowing a stream of non-sorbable gas in contact with the physical sorbent material, following which the sorbent material is maintained under inert gas blanket or other non-sorption conditions while cooling from the elevated temperature level of the prior heating operation. After cooling, the sorbent material may be loaded into the gas storage and dispensing vessel. Alternatively, such cooling step may be omitted in favor of simply charging the hot sorbent material into the storage and dispensing vessel so that the walls of the vessel act as a heat transfer medium to effect cool-down of the sorbent material.

In the preferred practice of the invention, the process of the invention is carried out such that during the time beginning with the step of (1) treating the physical sorbent material to desorb at least part of the extraneous sorbables from the sorbent material, and ending with the completion of the step of (2) sealing the dispenser container so that it thereafter contains the dispensing gas in a form available for selective dispensing, the physical sorbent material is isolated from contact with sorbable gases other than the dispensing gas. Preferably, the sorbent material is isolated through such steps from any contact with atmospheric gases, e.g., oxygen, water vapor, etc.

When activated carbon material is used as the sorbent material, it generally is desirable to treat the physical sorbent material to remove extraneous sorbables therefrom by step (s) including heating of the sorbent to a temperature exceeding 650° C., preferably with isolation of the sorbent material from contact with oxygen, water vapor, etc., during and subsequent to such treatment, until the dispenser container is finally sealed so that it thereafter contains the dispensing gas in a form available for selective dispensing.

Additionally, or alternatively, the sorbent material after being charged to the storage and dispensing vessel, may be subjected to heating, concurrently with imposition of vacuum conditions on the interior volume of the vessel, to remove extraneous sorbables.

As a further alternative, a combination of such preloading and post-loading steps may be carried out, to maximize the removal of extraneous sorbables from the sorbent material which is utilized as the storage medium for the gas to be stored and dispensed from the vessel in subsequent use.

After the sorbent material has been treated and the gas to be stored and dispensed has been introduced to the sorbent material and physically adsorbed thereon, the vessel may be sealed in a conventional manner, as for example by installation of a valve head assembly on the vessel, or alternatively the container may be coupled to a flow manifold or other dispensing apparatus which thereafter is selectively actuatable to provide on-demand dispensing of gas from the storage and dispensing vessel, involving desorption of the adsorbed product gas (referred to hereinafter as the "dispensing gas").

The dispensing gas may be of any suitable type for which the physical adsorbent material has appropriate sorptive affinity, as for example silane, diborane, arsine, phosphine, chlorine, $BCl_3$, $BF_3$, $B_2D_6$, tungsten hexafluoride, $(CH_3)_3Sb$, hydrogen fluoride, hydrogen chloride, $GeF_4$, $SiF_4$, deuterated hydrides, hydrogen iodide, hydrogen bromide, germane, ammonia, stibine, hydrogen sulfide, hydrogen selenide, hydrogen telluride, $NF_3$, or compatible mixtures of one or more of the foregoing gas species.

The gas storage and dispensing system of the present invention provides a convenient means and method of storing and selectively dispensing gases from the storage and dispensing vessel, which may be maintained at low pressure, thereby providing a significant advance in the art over high pressure gas cylinders which have been the standard apparatus for storage and transport of gases in the semiconductor industry.

As used herein, the term "low pressure" means a pressure not substantially exceeding 1 atmosphere, e.g., a pressure $\leq 1.25$ atmosphere, more preferably a pressure $\leq 1.0$ atmosphere, and most preferably a pressure within the range of from about 0.15 to about 0.8 atmosphere.

It will be recognized that the storage and dispensing system of the present invention may be operated at higher pressures than in the above-described low pressure regime, within the broad practice of the invention, however such low pressure storage and dispensing system has particular utility in applications where the fluid is employed at subatmospheric pressure, as for example in ion implantation applications. In such end usages, the system of the invention permits fluid to be stored and dispensed at low pressure.

By such low pressure operation, the system of the invention obviates the necessity in many applications for high pressure fluid vessels of the prior art which heretofore have been used in such applications. Particularly where hazardous gases are involved, the use of high pressure vessels entails an enhanced risk of leakage and harm to persons and/or property, relative to the low pressure system of the present invention, where the gas may be stored at near ambient pressure levels, and dispensed in a ready and controllable manner.

The gas storage and dispensing system of the invention comprises a leak-tight vessel, such as a gas cylinder, containing the fluid to be dispensed, e.g., arsine, boron trifluoride, germane, etc., adsorbed into a sorbent material, such as a carbonaceous physical adsorbent material. In the case of dispensing gases such as hydride gases, activated carbon sorbents or molecular sieve sorbents efficiently reduce the vapor pressure of the sorbate gas to 1 atmosphere.

As used herein, the term "carbonaceous" in reference to the physical sorbent material of the invention, means that the sorbent material comprises elemental carbon as its major component in the sorbent mass. Preferred forms of carbon sorbent materials include: carbon formed by pyrolysis of synthetic hydrocarbon resins such as polyacrylonitrile, sulfonated polystryrene-divinylbenzene, etc.; cellulosic char; charcoal; activated carbon formed from natural source materials such as coconut shells, pitch, wood, petroleum, coal, etc.

A preferred carbon sorbent material is activated carbon, a highly sorbent form of carbon produced by heating granulated charcoal to appropriate elevated temperature. Most preferred are the so-called bead carbon forms of activated carbon, where the beads, i.e., highly uniform diameter spherical particles, may have a diameter in the range of from about 0.1 to about 1 centimeter, and more preferably from about 0.25 to about 2 millimeters diameter.

Commercially available carbon sorbent materials which are preferred in the broad practice of the invention include bead carbon materials designated as BAC-MP, BAC-LP, and BAC-G-70R, available from Kureha Corporation of America, New York, N.Y.; Ambersorb® carbonaceous sorbents commercially available from Rohm & Haas Company, Philadelphia, Pa. as grades Ambersorb® 563, Ambersorb® 564, Ambersorb® 348F, Ambersorb® 575, Ambersorb® 572, and Ambersorb® 1500; Calgon Filtrasorb 400® and BPL GAC carbon sorbent materials commercially available from Calgon Carbon Corporation; and bead activated carbon sorbent materials commercially available from Blucher GmbH, Erkrath, Germany. The aforementioned Ambersorb materials have substantial pore volume in pores greater than 50 Angstroms, and in general such large pore sized materials are less preferred than those having pores not exceeding about 40 Angstroms.

The sorbent used in the storage and dispensing system of the invention may have any suitable size, shape and conformation appropriate to the end use application and the specific sorbate fluid species involved. The sorbent material may for example be in the form of beads, granules, pellets, tablets, powders, particulates, extrudates, cloth or web form materials, honeycomb matrix monolith, composites (of the carbon sorbent with other components), or comminuted or crushed forms of the foregoing conformations.

Collectively, the storage and delivery system of the present invention may usefully consist of a standard gas cylinder, and a cylinder valve or other flow dispensing assembly (regulators, monitors, sensors, flow directing means, pressure controllers, mass flow controllers, piping, valving, instrumentation, automatic start and shut-off devices, etc.) coupled to the cylinder, with the cylinder holding the sorbent material, and the cylinder is filled, e.g., to 1 atmosphere pressure, with a dispensing gas such as a hydride gas.

Fluid flow from the storage and delivery system of the invention by pressure differential desorption may be readily carried out by utilizing a pressure differential between the pressure in the interior volume of the storage and delivery system and a lower pressure exterior to the sorbent-containing vessel.

For example, the sorbent-containing vessel may hold a reagent gas such as phosphine at a subatmospheric pressure, e.g., 600 Torr, for use in an ion implantation process, where the ion implant chamber for implanting the phosphorus constituent is maintained under vacuum conditions or alternatively at low pressure, e.g., below 100 Torr, below the pressure of the interior volume in the storage and dispensing vessel. As a result, phosphine gas will desorb from the sorbent in the vessel and flow to the ion implant chamber, when gas flow communication is established between the ion implant chamber and the storage and dispensing vessel containing the sorbate phosphine gas. The storage and dispensing system thus effects flow of the phosphine gas through the connecting piping, valving and instrumentation, and is readily controllable at a desired flow rate. Utilizing a device such as a mass flow controller, a constant flow can be achieved as the sorbent vessel pressure decreases with continued dispensing operation.

Additionally, or alternatively, the gas dispensing assembly of the storage and dispensing system of the invention may include means for heating the sorbent material, to thermally desorb sorbate fluid therefrom. Such heating means may include any suitable heat transfer or heat exchange devices, structures or apparatus, which are operatively associated with the sorbent material to effect heating thereof, for thermal desorption of the sorbate from the sorbent medium.

Thus, the present invention contemplates heat- and/or pressure-mediated dispensing of sorbate fluid from the sorbent on which same is stored.

The specific sorbent materials used in the practice of the invention, and their pore size, pore volume, and surface area characteristics may be widely varied in the broad practice of the present invention. The skilled artisan may readily determine suitable sorbent characteristics for a given end use application of the storage and dispensing system of the present invention without undue experimentation using surface area and porosity determinations, e.g., with mercury porosimetry techniques, and affinity studies for the particular fluid sought to be stored on and dispensed from the particular candidate sorbent material.

In the manufacture of the storage and dispensing system of the invention, the storage and dispensing vessel is cleaned, if required, to ensure the absence of any contaminants or species therein, including out-gassable species in the walls of the vessel, which may adversely impact the storage and dispensing operation subsequently carried out with the vessel. For this purpose, it may be desirable to bake out, solvent degrease, or otherwise subject the vessel and its interior surfaces to cleaning, removal or treatment steps, to provide an appropriately clean container for the subsequently installed sorbent material.

The sorbent material then is treated in accordance with the process of the invention to remove extraneous sorbables therefrom, and the sorbent material is then loaded with the gas to be stored thereon and subsequently dispensed, by filling the vessel holding the pretreated sorbent material with the dispensing gas.

During the filling process, the temperature of the vessel and the sorbent material may be independently monitored, along with the dispensing gas temperature, for process control purposes. Pressure is monitored to determine the endpoint of the fill process.

It may be desirable to fill the vessel with the dispensing gas in stages, and to allow equilibration of the system so that the temperature effects are at least partially dissipated to the ambient environment or to a heat transfer medium provided for such purpose.

Alternatively, it may be suitable to fill the vessel to a specified pressure, and then allow the vessel to cool to a final temperature and pressure condition of the sorbent bed and associated vessel.

Thus, dose filling or continuous filling of the dispensing gas may be carried out, to introduce the dispensing gas into the vessel for sorptive take-up by the sorbent material therein. Following the fill sequence, the vessel, after its disengagement from the fill manifold, may be shipped, stored, or arranged for subsequent dispensing use by attachment to piping, coupling, and dispensing circuitry at the dispensing site.

The storage and delivery system apparatus and method of the invention provide a significantly safer alternative to the current use of high pressure gas cylinders for the storage and dispensing of sorbable gases. The invention provides the capability to transport, store and deliver sorbable gases from a cylinder or other vessel at zero psig. The dispensing gas is physically adsorbed by the pores, surfaces and microcavities of the sorbent material, thereby significantly reducing the pressure of gas for storage and dispensing purposes.

In the dispensing operation, with only low level heating of the sorbent material, by so-called thermally assisted delivery, it is possible to augment the delivery rate of the desorbing gas, so that flow rates of up to 500 sccm and higher are readily achievable. Nonetheless, high rates of gas delivery can be achieved with adiabatic operation (no supplemental input of heat or thermal energy to the sorbate-laden sorbent medium), solely by the pressure differential existing between the sorbent vessel and a reduced pressure of the external dispensing locus, e.g., in a semiconductor or other industrial or manufacturing process facility, such as an ion implantation chamber, molecular beam epitaxy unit, or chemical vapor deposition reactor.

The gas storage and dispensing apparatus may be readily provided in a unitary apparatus form, as for example by disposing one or more storage and dispensing systems of the invention in a gas cabinet. In such gas cabinet arrangement involving a multiplicity of sorbent vessels, each of the vessels may be manifolded together for selective delivery of sorbate gas from one or more of such vessels. The cabinet may further include therein independent thermocouples, or other temperature sensing/monitoring equipment and components, for preventing overheating of the vessels and/ or other internal components of the gas cabinet, in use thereof.

Such gas source cabinet may additionally include a fusible link heater element for selective augmentive heating of the vessels and sorbent therein; a sprinkler system; an exhaust heat sensor; a toxic gas monitor which functions to shut down the apparatus when toxic gas is sensed; a scrubber or bulk sorption device; and redundant pressure and temperature control means. With such a storage and delivery system apparatus, delivery rates of gas of 500 sccm at 15 psig are readily attainable.

Figure 1:
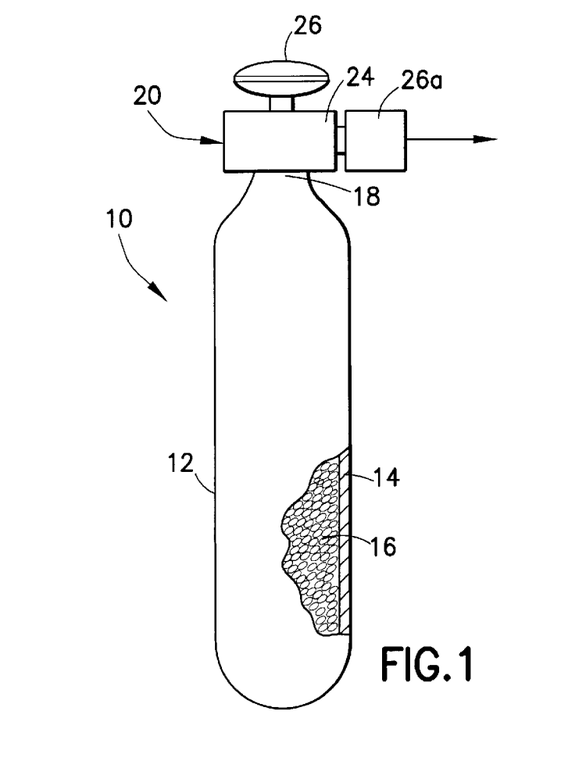
FIG. 1 is a schematic representation of a storage and delivery system according to one embodiment of the invention.

Referring now to the drawings, FIG. 1 is a schematic representation of a gas storage and dispensing system 10 according to one embodiment of the present invention.

The gas storage and dispensing system 10 includes a gas storage and dispensing vessel 12 which may be in the form of a conventional gas cylinder with a cylindrical wall 14 enclosing an interior volume.

In the interior volume of the vessel 12 is disposed a physical sorbent material 16, such as a molecular sieve material or a bead activated carbon material, or any other suitable sorbent medium. The sorbent material is typically employed in a finely divided form, such as pellets, beads, granules, or the like, to provide a bed of the sorbent material having high surface area as measured by standard porosimetry (e.g., Brunnauer-Emmit-Teller) methodology.

The gas storage and dispensing vessel 12 is of elongate character as shown, with a neck 18 to which is joined a valve head assembly 20, which in the embodiment shown includes a unitary block valve body 24, having a hand wheel 26 coupled thereto for manual opening and closure of the valve in the valve body. The valve body 24 has a coupling 26a, such as a VCR connector, associated therewith, for dispensing of gas desorbed from the sorbent material in the gas storage and dispensing vessel, when the hand wheel 26 is turned to open the valve in the valve body 24.

By such arrangement, the gas may be released from the gas storage and dispensing container, when the exterior pressure of the downstream dispensing locus is below the pressure of the interior volume of the vessel 12, as for example is the case in ion implantation applications, in which the downstream ionizer is maintained at very low pressure conditions.

Alternatively, the coupling 26a may join the gas storage and dispensing vessel 12 to a manifold or flow circuit containing a pump, blower, ejector, eductor, compressor, fan, cryopump, pressure-building circuit, or other motive fluid impeller device serving to extract the sorbate gas from the sorbent material bed in the vessel 12.

As a still further alternative, the vessel 12 or the sorbent material therein may be directly or indirectly heated to effect thermal desorption of the dispensing gas from the sorbent material in the vessel. For example, the vessel 12 may be disposed in a heating jacket (not shown), or have heating coils (likewise not shown) interiorly disposed in the vessel throughout the sorbent bed, for such purpose.

The system 10 shown illustratively in FIG. 1 therefore permits the selective dispensing of the sorbate gas from the physical sorbent material in the vessel 12, in any suitable dispensing modality (pressure differential-mediated desorption and/or thermally mediated desorption), to discharge the dispensing gas from the vessel.

Figure 2:
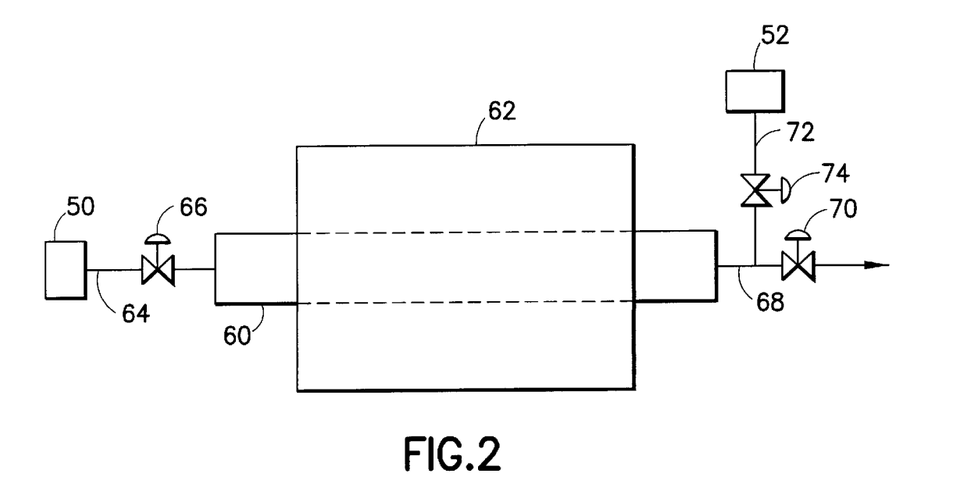
FIG. 2 is a schematic representation of a process system for carrying out the process of the present invention, in one embodiment thereof.

FIG. 2 is a schematic representation of an adsorbent processing system for treating the physical sorbent material in accordance with the process of the invention, to desorb extraneous sorbables from the sorbent.

The FIG. 2 system includes an inert gas source 50 which may be a vessel containing inert gas such as helium, argon, krypton, nitrogen, etc. connected to inert gas feed line 64 having flow control valve 66 therein. The inert gas feed line 64 is connected in flow relationship to the container 60 of sorbent material to be treated.

Container 60 may for example be a gas storage and dispensing vessel which thereafter is filled with dispensing gas and sealed to provide the finally fabricated gas storage and dispensing system, or it may comprise another vessel from which the treated sorbent is transferred to the gas storage and dispensing vessel of the product gas storage and dispensing system.

In the FIG. 2 system, the container 60 is disposed in a furnace 62 which is constructed and arranged to heat the container 60 and its sorbent material contents to a predetermined temperature to thermally desorb the extraneous sorbables from the sorbent material. The furnace may be constructed in a conventional manner for such purpose, and may for example be arranged to selectively heat the container 60 and its contents to a temperature in the range of from about 100° C. to about 1500° C.

Also connected to the container 60 to accommodate flow of the inert gas therethrough is an inert gas effluent line 68 containing flow control valve 70 therein, for discharging the inert gas from the treatment system.

Joined to inert gas discharge line 68 is a vacuum line 72 containing a flow control valve 74 therein, and joined to a vacuum pump 52.

The sorbent treatment process of the invention, in an illustrative embodiment thereof, will now be described with reference to the FIG. 2 sorbent material treatment system, and with reference to the FIG. 3 flowsheet of process steps.

Figure 3:
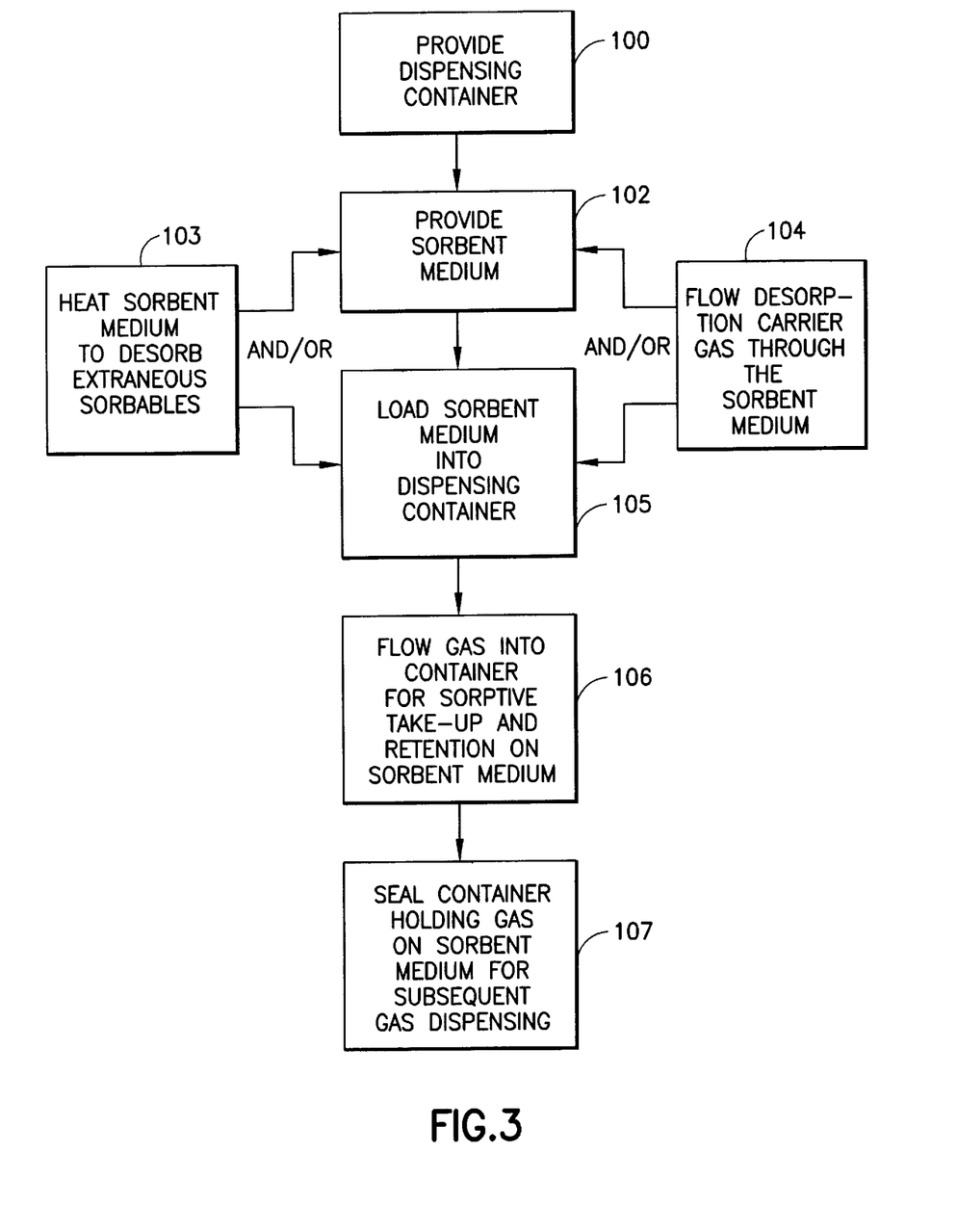
FIG. 3 is a schematic flowsheet of a process according to the present invention, reflecting the specific steps thereof.

The illustrative process is carried out by providing the dispensing container 60 (step 100 of FIG. 3) and providing sorbent material (step 102 of FIG. 3) which is loaded into the container (step 105 of FIG. 3).

The sorbent material may be treated before and/or after loading into the container (steps 103 and 104 of FIG. 3). In the illustrative embodiment, the container 60 is positioned in furnace 62, and the furnace is actuated to heat the container. Concurrently, the flow control valve 66 is opened to flow the inert gas from source 50 in line 64 through container 60 for discharge therefrom into line 68 with the valve 70 being in open condition to accommodate flow of the inert gas and any entrained extraneous sorbables desorbed from the heated sorbent material. The heating and flow of inert gas effect desorption of extraneous sorbables and efflux thereof from the system in discharge line 68.

During this operation, valve 74 is closed. When the heating and flow of inert gas has been completed, the valves 66 and 70 are closed, and the furnace is shut off or optionally maintained on at a lower temperature condition during the ensuing step.

Next, the valve 74 is opened, and the vacuum pump 52 is actuated, to effect vacuum desorption of the remaining extraneous sorbables on the sorbent material in the container 60, optionally augmented by the heating of the furnace 62 as mentioned.

There is resultingly produced a container of sorbent material that is substantially reduced in extraneous sorbables content.

The container holding the sorbent material then is charged with the dispensing gas (step 106 of FIG. 3), and the dispensing gas is taken up sorptively by the sorbent material, and held for subsequent dispensing operation.

Finally, the container holding the dispensing gas-laden sorbent material is sealed (step 107 of FIG. 3). The sealing operation may involve mechanical steps such as closure of valves, or fluidic isolation of the container, or installation of a valve head assembly, plugs, closures, or other sealing components, to provide the gas storage and dispensing system in a form for subsequent use. The sealing operation may be carried out under vacuum or inert gas environment, as appropriate or desirable in the fabrication of the specific gas storage and dispensing system of the invention.

In the pretreatment of the sorbent material in the practice of the present invention, wherein the extraneous sorbables include carbon monoxide, the step of treating the physical sorbent material to desorb from the sorbent material at least part of said extraneous sorbables, is advantageously carried out to yield a carbon monoxide level of less than 20 parts per million volume (ppmv) in arsine, when the physical sorbent material is loaded with arsine gas at a loading of 50% weight based on the weight of the physical sorbent material, a pressure of 700 Torr and a temperature of 22° C.

Correspondingly, when the extraneous sorbables include carbon dioxide, the physical sorbent material is advantageously treated to desorb extraneous sorbables, so as to yield a carbon dioxide level of less than 50 parts per million volume (ppmv) in arsine, when the physical sorbent material is loaded with arsine gas at a loading of 50% weight based on the weight of the physical sorbent material, a pressure of 700 Torr and a temperature of 22° C.

The step of treating the physical sorbent material to desorb the extraneous sorbables may suitably include heating the physical sorbent material before loading the physical sorbent material in said container to a temperature in the range of from about 300 to about 800° C. for sufficient time to effect desorption of the extraneous sorbables therefrom, optionally with inert gas, e.g., helium, being flowed in contact with the physical sorbent material during such heating of the physical sorbent material.

Figure 4:
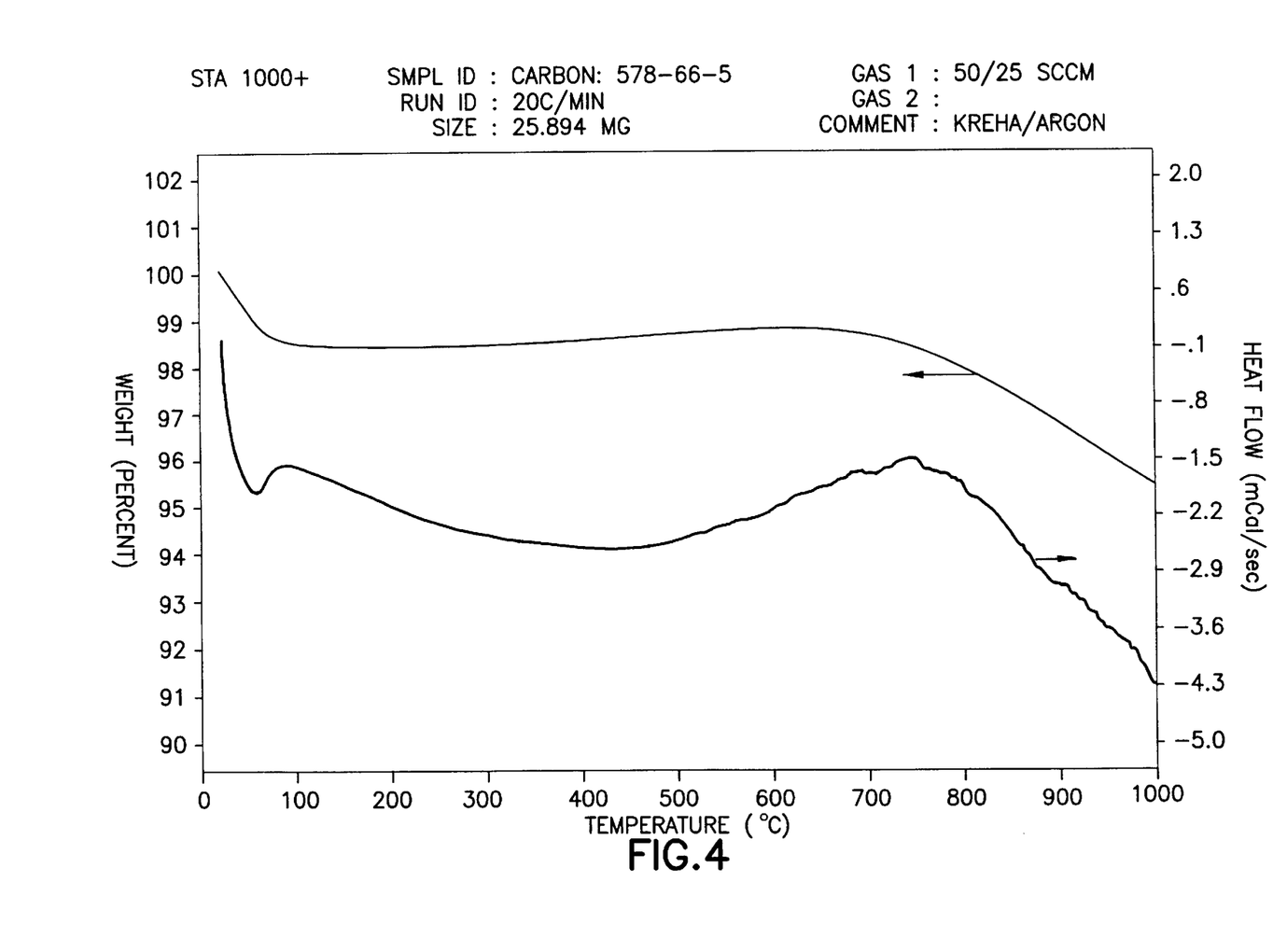
FIG. 4 is a thermogravimetric analysis (TGA) plot for an activated carbon sorbent material, showing the desorption loss of oxygen-containing groups from the sorbent material with heating to above 650° C.

FIG. 4 is a thermogravimetric analysis (TGA) plot for an activated carbon sorbent material, showing the desorption loss of oxygen-containing groups from the sorbent material with heating to above 650° C. The TGA spectrum illustrated was obtained for a bead activated carbon material, under an argon atmosphere. As is shown by the weight loss curve, the material at temperatures up to about 100° C. loses weight by progressively increasing desorption of water vapor. Subsequently, as the temperature is raised, the weight of the sorbent material remains essentially constant up until a temperature of about 650° C. Above such temperature of 650° C., the weight loss significantly increases, as oxygen-containing groups such as CO and $CO_2$ are desorbed and driven off from the sorbent material.

It therefore is critically important to the achievement of high purity in the dispensed gas, to ensure that the temperature of the heating operation is increased significantly beyond the point where the weight loss change becomes zero, when residual extraneous sorbables remain on the sorbent material at such point. Thus, although it would be surmised based on the initial weight loss (at temperatures up to 100° C.) and subsequent invariance with increasing temperature (up to 600° C.) that the sorbent has been purged of all extraneous sorbables, it nonetheless markedly increases the purity of the dispensing gas to continue heating above about 650° C., for sufficient time and to sufficient extent, to drive off the residual extraneous sorbables from the sorbent material.

In such heating to elevated temperature, it is important to maintain the ambient environment of the sorbent material free of sorbable components that may deposit on the sorbent material and contaminate the sorbent material (and dispensing gas) in subsequent operation of the storage and dispensing vessel.

In a particularly preferred embodiment of the inventive process for fabricating a gas storage and dispensing system including a dispenser container for holding a bead activated carbon physical sorbent material having sorptive affinity for (i) a sorbable dispensing gas to be held in and subsequently selectively discharged from the dispenser container, and (ii) extraneous sorbables, the fabrication process includes the following steps:

treating the physical sorbent material, having extraneous sorbables sorbed thereon, to desorb from the sorbent material at least part of the extraneous sorbables, comprising heating the physical sorbent material to a temperature in a first range of from about 300° C. to about 800° C. and maintaining the temperature in the first range for a period of from about 1 to 15 hours, and during such heating flowing an inert gas in contact with the physical sorbent material;

loading the physical sorbent material in the container;

heating the physical sorbent material in said container to a temperature in a second range of from about 100° C. to about 250° C. and maintaining the temperature in the second range for a period of from about 1 to 10 hours, and during such heating applying vacuum to the physical sorbent material in the container;

cooling the physical sorbent material to a temperature below the second temperature range;

introducing the sorbable dispensing gas into the dispensing container holding the physical sorbent material for physical sorption of the dispensing gas on the physical sorbent material; and sealing the dispenser container holding the dispenser gas on the physical sorbent material so that the dispenser container thereafter contains the dispensing gas in a form available for selective dispensing by desorption of the dispensing gas from the physical sorbent material and discharging of the dispensing gas from the container.

Such fabrication process may be carried out so when the extraneous sorbables include carbon monoxide, so that the sorbent material after treatment has a carbon monoxide level of less than 20 parts per million volume (ppmv) in arsine, when the physical sorbent material is loaded with arsine gas at a loading of 50% weight based on the weight of the physical sorbent material, a pressure of 700 Torr and a temperature of 22° C., and when carbon dioxide is an extraneous sorbable, a carbon dioxide level of less than 50 parts per million volume (ppmv) in arsine, when the physical sorbent material is loaded with arsine gas at a loading of 50% weight based on the weight of the physical sorbent material, a pressure of 700 Torr and a temperature of 22° C.

By way of illustration, when the extraneous sorbables include carbon monoxide and carbon dioxide, the physical sorbent material can be efficiently treated in accordance with the present invention to desorb the extraneous sorbables and produce a treated sorbent material yielding a carbon monoxide level of less than 1 part per million volume (ppmv) in arsine, and a carbon dioxide level of less than 10 parts per million volume (ppmv) in arsine, when the physical sorbent material is loaded with arsine gas at a loading of 50% weight based on the weight of the physical sorbent material, a pressure of 700 Torr and a temperature of 22° C.

The features and advantages of the invention are more fully shown by the following non-limiting examples.

EXAMPLE I

A quantity of Kureha BAC activated carbon adsorbent (Kureha Corporation, New York, N.Y.) was a stainless steel sample cylinder and placed in a furnace in a process system configured as schematically shown in FIG. 2. The furnace in the process system was directly coupled to a glove box for post-furnace processing.

After pretreating the adsorbent at 300 to 800° C. for 12 hours under helium flow, the adsorbent was charged into a storage and dispensing vessel (gas cylinder) under inert atmosphere, followed by a 5 hour degassing operation at 150° C. under vacuum. The vessel was then filled with arsine gas to 700 Torr pressure at 22° C.

The arsine loading was 50% by weight based on the original weight of the sorbent material, which was the same loading concurrently imposed on a corresponding batch of sorbent material that had not been subjected to any pretreatment, in a separate vessel as a control.

The arsine gas was then dispensed from both vessels and independently flowed through a gas chromatograph equipped with a discharge ionization detector (DID). The CO and $CO_2$ levels in the arsine gas from the vessel containing the pretreated sorbent material was found to be significantly reduced in relation to the arsine gas from the control vessel containing the untreated sorbent material, as shown in Table A below.

TABLE A

| Desorbed Arsine Gas Analysis by GC | | |
| --- | --- | --- |
| Extraneous Sorbable | CO (ppmv) | $CO_2$ (ppmv) |
| Untreated Sorbent | 29 | 104 |
| Pretreated Sorbent | Non-detectable | .13 |

The GC-DID detection limit was 0.05 ppmv for CO and 0.02 ppmv for $CO_2$ in the foregoing analysis.

In a corresponding test in which the pretreated sorbent was transferred from the furnace to a glove box physically separated from the furnace, ambient air contact between the furnace and the glove box caused the sorbent material to take up substantial $CO_2$ so that under otherwise corresponding treatment and processing conditions in relation to the Pretreated Sorbent sample in Table A, the $CO_2$ concentration was found to be 4.9 ppmv. This air-exposed material thus exhibited a $CO_2$ concentration that was over 37 times higher than the $CO_2$ concentration of the Pretreated Sorbent of Table A (isolated from ambient air exposure).

While the invention has been shown and described herein with reference to various illustrative aspects, features and embodiments, it will be appreciated that the utility of the invention is not thus limited, but rather extends to and encompasses numerous other variations, modifications and embodiments as will readily suggest themselves to those of ordinary skill in the art. Accordingly, the invention herein disclosed is to be broadly considered and construed, as emcompassing all such alternative variations, modifications and other embodiments, within the spirit and scope of the claims hereafter set forth.

What is claimed is:

1. A process for fabricating a gas storage and dispensing system including a dispenser container for holding a physical sorbent material having sorptive affinity for (i) a sorbable dispensing gas to be held in and subsequently selectively discharged from the dispenser container, and (ii) extraneous sorbables, said process comprising:

treating the physical sorbent material, having extraneous sorbables sorbed thereon, to desorb from the sorbent material at least part of said extraneous sorbables, wherein said treating comprises heating of the sorbent material to a temperature exceeding 650° C.;

loading the physical sorbent material in said container;

introducing the sorbable dispensing gas into the dispensing container holding the physical sorbent material for physical sorption of the dispensing gas on the physical sorbent material; and sealing the dispenser container holding the dispenser gas on the physical sorbent material so that the dispenser container thereafter contains the dispensing gas in a form available for selective dispensing by desorption of the dispensing gas from the physical sorbent material and discharging of the dispensing gas from the container.

2. A process according to claim 1, wherein the step of treating the physical sorbent material to desorb from the sorbent material at least part of said extraneous sorbables, further comprises at least one of the steps of:

(a) flowing a non-sorbable gas in contact with the physical sorbent material to desorb the extraneous sorbables from the physical sorbent material into the flowing non-sorbable gas; and applying vacuum conditions to the physical sorbent material to vacuum desorb the extraneous sorbables from the physical sorbent material.

3. A process according to claim 1, wherein the step of treating the physical sorbent material to desorb from the sorbent material at least part of said extraneous sorbables, further comprises flowing a non-sorbable gas in contact with the physical sorbent material to desorb the extraneous sorbables from the physical sorbent material into the flowing non-sorbable gas.

4. A process according to claim 1, wherein the step of treating the physical sorbent material to desorb from the sorbent material at least part of said extraneous sorbables, further comprises applying vacuum conditions to the physical sorbent material to vacuum desorb the extraneous sorbables from the physical sorbent material.

5. A process according to claim 1, wherein the step of treating the physical sorbent material to desorb from the sorbent material at least part of said extraneous sorbables, further comprises the steps of:

(a) flowing a non-sorbable gas in contact with the physical sorbent material to desorb the extraneous sorbables from the physical sorbent material into the flowing non-sorbable gas; and (b) applying vacuum conditions to the physical sorbent material to vacuum desorb the extraneous sorbables from the physical sorbent material.

6. A process according to claim 1, wherein the step of treating the physical sorbent material to desorb from the sorbent material at least part of said extraneous sorbables, is carried out before the step of loading the physical sorbent material in said container.

7. A process according to claim 1, wherein the step of treating the physical sorbent material to desorb from the sorbent material at least part of said extraneous sorbables, is carried out after the step of loading the physical sorbent material in said container.

8. A process according to claim 1, wherein the step of treating the physical sorbent material to desorb from the sorbent material at least part of said extraneous sorbables, is carried out before and after the step of loading the physical sorbent material in said container.

9. A process according to claim 1, wherein the physical sorbent material is selected from the group consisting of alumina, silica, crystalline aluminosilicates, macroreticulate polymers, kieselguhr, and carbon.

10. A process according to claim 1, wherein the physical sorbent material is selected from the group comprising carbon, and bead activated carbon.

11. A process according to claim 1, wherein the extraneous sorbables include gas species selected from the group consisting of water vapor, oxygen, hydrogen, carbon oxides, nitrogen, hydrocarbons, halogens, and compositions containing one or more of the foregoing species.

12. A process according to claim 1, wherein the extraneous sorbables include carbon oxides.

13. A process according to claim 1, wherein the extraneous sorbables include at least one of carbon monoxide and carbon dioxide.

14. A process according to claim 1, wherein the extraneous sorbables include carbon monoxide, and said step of treating the physical sorbent material, having extraneous sorbables sorbed thereon, to desorb from the sorbent material at least part of said extraneous sorbables, yields a carbon monoxide level of less than 20 parts per million volume (ppmv) in arsine, when the physical sorbent material is loaded with arsine gas at a loading of 50% weight based on the weight of the physical sorbent material, a pressure of 700 Torr and a temperature of 22° C.

15. A process according to claim 1, wherein the extraneous sorbables include carbon dioxide, and said step of treating the physical sorbent material, having extraneous sorbables sorbed thereon, to desorb from the sorbent material at least part of said extraneous sorbables, yields a carbon dioxide level of less than 50 parts per million volume (ppmv) in arsine, when the physical sorbent material is loaded with arsine gas at a loading of 50% weight based on the weight of the physical sorbent material, a pressure of 700 Torr and a temperature of 22° C.

16. A process according to claim 1, wherein said step of treating the physical sorbent material, having extraneous sorbables sorbed thereon, to desorb from the sorbent material at least part of said extraneous sorbables, comprises heating the physical sorbent material before loading the physical sorbent material in said container to a temperature in the range of from about 650° C. to about 800° C. for sufficient time to effect desorption of the extraneous sorbables therefrom.

17. A process according to claim 16, wherein inert gas is flowed in contact with the physical sorbent material during said step of heating the physical sorbent material.

18. A process according to claim 17, wherein said inert gas is helium.

19. A process according to claim 17, wherein the physical sorbent material after being loaded in the container is subjected to at least one of the steps selected from the group consisting of further heating the physical sorbent material, and applying vacuum to the physical sorbent material.

20. A process according to claim 17, wherein the physical sorbent material after being loaded in the container is subjected to further heating, under applied vacuum.

21. A process according to claim 16, wherein the physical sorbent material after being loaded in the container is subjected to at least one of the steps selected from the group consisting of further heating the physical sorbent material, and applying vacuum to the physical sorbent material.

22. A process according to claim 16, wherein the physical sorbent material after being loaded in the container is subjected to further heating, under applied vacuum.

23. A process according to claim 1, wherein the sorbable dispensing gas comprises a gas selected from the group consisting of silane, diborane, arsine, phosphine, chlorine, $BCl_3$, $BF_3$, $B_2D_6$, tungsten hexafluoride, $(CH_3)_3Sb$, hydrogen fluoride, hydrogen chloride, $GeF_4$, $SiF_4$, deuterated hydrides, hydrogen iodide, hydrogen bromide, germane, ammonia, stibine, hydrogen sulfide, hydrogen selenide, hydrogen telluride; and $NF_3$.

24. A process according to claim 1, wherein the sorbable dispensing gas comprises a hydride gas.

25. A process according to claim 1, wherein the sorbable dispensing gas comprises arsine.

26. A process according to claim 1, wherein the sorbable dispensing gas comprises phosphine.

27. A process according to claim 1, wherein the sorbable dispensing gas comprises boron trifluoride.

28. A process according to claim 1, wherein the sorbable dispensing gas comprises diborane.

29. A process according to claim 1, wherein the sorbable dispensing gas comprises deuterated stibine.

30. A process according to claim 1, wherein during a time beginning with the step of (1) treating the physical sorbent material to desorb at least part of the extraneous sorbables from the sorbent material, and ending with the completion of the step of (2) sealing the dispenser container so that it thereafter contains the dispensing gas in a form available for selective dispensing, the physical sorbent material is isolated from contact with atmospheric gases.

31. A process according to claim 30, wherein the physical sorbent during said time is isolated from contact with oxygen.

32. A process according to claim 1, wherein the extraneous sorbables include carbon monoxide, and said step of treating the physical sorbent material, having extraneous sorbables sorbed thereon, to desorb from the sorbent material at least part of said extraneous sorbables, yields a carbon monoxide level of less than 5 parts per million volume (ppmv) in arsine, when the physical sorbent material is loaded with arsine gas at a loading of 50% weight based on the weight of the physical sorbent material, a pressure of 700 Torr and a temperature of 22° C.

33. A process according to claim 1, wherein the extraneous sorbables include carbon dioxide, and said step of treating the physical sorbent material, having extraneous sorbables sorbed thereon, to desorb from the sorbent material at least part of said extraneous sorbables, yields a carbon dioxide level of less than 10 parts per million volume (ppmv) in arsine, when the physical sorbent material is loaded with arsine gas at a loading of 50% weight based on the weight of the physical sorbent material, a pressure of 700 Torr and a temperature of 22° C.

34. A process for fabricating a gas storage and dispensing system including a dispenser container for holding a bead activated carbon physical sorbent material having sorptive affinity for (i) a sorbable dispensing gas to be held in and subsequently selectively discharged from the dispenser container, and (ii) extraneous sorbables, said process comprising:

treating the physical sorbent material, having extraneous sorbables sorbed thereon, to desorb from the sorbent material at least part of said extraneous sorbables, comprising heating the physical sorbent material to a temperature in a first range of from about 300° C. to about 800° C. and maintaining the temperature in said first range for a period of from about 1 to 15 hours, and during said heating flowing an inert gas in contact with the physical sorbent material;

loading the physical sorbent material in said container;

heating the physical sorbent material in said container to a temperature in a second range of from about 100° C. to about 250° C. and maintaining the temperature in said second range for a period of from about 1 to 10 hours, and during said heating applying vacuum to the physical sorbent material in the container;

cooling the physical sorbent material to a temperature below said second temperature range;

introducing the sorbable dispensing gas into the dispensing container holding the physical sorbent material for physical sorption of the dispensing gas on the physical sorbent material; and sealing the dispenser container holding the dispensing gas on the physical sorbent material so that the dispenser container thereafter contains the dispensing gas in a form available for selective dispensing by desorption of the dispensing gas from the physical sorbent material and discharging of the dispensing gas from the container.

35. A process according to claim 34, wherein the extraneous sorbables include gas species selected from the group consisting of water vapor, oxygen, hydrogen, carbon oxides, nitrogen, hydrocarbons, halogens, and compositions containing one or more of the foregoing species.

36. A process according to claim 34, wherein the extraneous sorbables include carbon oxides.

37. A process according to claim 34, wherein the extraneous sorbables include at least one of carbon monoxide and carbon dioxide.

38. A process according to claim 34, wherein the extraneous sorbables include carbon monoxide, and said step of treating the physical sorbent material, having extraneous sorbables sorbed thereon, to desorb from the sorbent material at least part of said extraneous sorbables, yields a carbon monoxide level of less than 20 parts per million volume (ppmv) in arsine, when the physical sorbent material is loaded with arsine gas at a loading of 50% weight based on the weight of the physical sorbent material, a pressure of 700 Torr and a temperature of 22° C.

39. A process according to claim 34, wherein the extraneous sorbables include carbon dioxide, and said step of treating the physical sorbent material, having extraneous sorbables sorbed thereon, to desorb from the sorbent material at least part of said extraneous sorbables, yields a carbon dioxide level of less than 50 parts per million volume (ppmv) in arsine, when the physical sorbent material is loaded with arsine gas at a loading of 50% weight based on the weight of the physical sorbent material, a pressure of 700 Torr and a temperature of 22° C.

40. A process according to claim 34, wherein the extraneous sorbables include carbon monoxide and carbon dioxide, and said step of treating the physical sorbent material, having extraneous sorbables sorbed thereon, to desorb from the sorbent material at least part of said extraneous sorbables, and said step of heating the physical sorbent material in said container to a temperature in a second range of from about 100° C. to about 250° C. and maintaining the temperature in said second range for a period of from about 1 to 10 hours, and during said heating applying vacuum to the physical sorbent material physical sorbent material in the container, together yield a carbon monoxide level of less than 1 part per million volume (ppmv) in arsine, and a carbon dioxide level of less than 10 parts per million volume (ppmv) in arsine, when the physical sorbent material is loaded with arsine gas at a loading of 50% weight based on the weight of the physical sorbent material, a pressure of 700 Torr and a temperature of 22° C.

41. A process according to claim 34, wherein the sorbable dispensing gas comprises a gas selected from the group consisting of silane, diborane, arsine, phosphine, chlorine, $BCl_3$, $BF_3$, $B_2D_6$, tungsten hexafluoride, $(CH_3)_3Sb$,, hydrogen fluoride, hydrogen chloride, $GeF_4$, $SiF_4$, deuterated hydrides, hydrogen iodide, hydrogen bromide, germane, anunonia, stibine, hydrogen sulfide, hydrogen selenide, hydrogen telluride, and $NF_3$.

42. A process according to claim 34, wherein the sorbable dispensing gas comprises a hydride gas.

43. A process according to claim 34, wherein the sorbable dispensing gas comprises arsine.

44. A process according to claim 34, wherein the sorbable dispensing gas comprises phosphine.

45. A process according to claim 34, wherein the sorbable dispensing gas comprises boron trifluoride.

46. A process according to claim 34, wherein the sorbable dispensing gas comprises diborane.

47. A process according to claim 34, wherein the sorbable dispensing gas comprises deuterated stibine.

48. A process according to claim 34, wherein the extraneous sorbables include carbon monoxide, and said step of treating the physical sorbent material, having extraneous sorbables sorbed thereon, to desorb from the sorbent material at least part of said extraneous sorbables, yields a carbon monoxide level of less than 1 part per million volume (ppmv) in arsine, when the physical sorbent material is loaded with arsine gas at a loading of 50% weight based on the weight of the physical sorbent material, a pressure of 700 Torr and a temperature of 22° C.

49. A process according to claim 34, wherein the extraneous sorbables include carbon dioxide, and said step of treating the physical sorbent material, having extraneous sorbables sorbed thereon, to desorb from the sorbent material at least part of said extraneous sorbables, yields a carbon dioxide level of less than 1 part per million volume (ppmv) in arsine, when the physical sorbent material is loaded with arsine gas at a loading of 50% weight based on the weight of the physical sorbent material, a pressure of 700 Torr and a temperature of 22° C.

50. A process for fabricating a gas storage and dispensing system including a dispenser container for holding a physical sorbent material having sorptive affinity for (i) a sorbable dispensing gas to be held in and subsequently selectively discharged from the dispenser container, and (ii) extraneous sorbables, said process comprising:

treating the physical sorbent material having extraneous sorbables sorbed thereon, to desorb from the sorbent material at least part of said extraneous sorbables;

loading the physical sorbent material in said container;

introducing the sorbable dispensing gas into the dispensing container holding the physical sorbent material for physical sorption of the dispensing gas on the physical sorbent material; and sealing the dispenser container holding the dispenser gas on the physical sorbent material so that the dispenser container thereafter contains the dispensing gas in a form available for selective dispensing by desorption of the dispensing gas from the physical sorbent material and discharging of the dispensing gas from the container, wherein an activated carbon material is used as the sorbent material, and the treatment of the physical sorbent material to remove extraneous sorbables therefrom comprises step(s) including heating of the sorbent to a temperature exceeding 650° C.

51. A process according to claim 50, wherein the sorbent material is isolated from contact with oxygen and water vapor during and subsequent to said heating to a temperature exceeding 650° C., until the dispenser container is sealed so that it thereafter contains the dispensing gas in a form available for selective dispensing.

* * * * *

UNITED STATES PATENT AND TRADEMARK OFFICE
CERTIFICATE OF CORRECTION

PATENT NO : 6,083,298
DATED : July 4, 2000
INVENTOR(S) : Wang et al.

It is certified that error appears in the above-identified patent and that said Letters Patent are hereby corrected as shown below:

Column 6, line 9 : after "U.S." (first instance), insert -- Pat. --

Column 6, line 11: after "al." insert -- , --

Signed and Sealed this

Twenty-second Day of May, 2001

*Attest:*

NICHOLAS P. GODICI

*Attesting Officer*     *Acting Director of the United States Patent and Trademark Office*